Sept. 27, 1932.  J. K. PUTNAM  1,879,481
VALVE
Filed Dec. 13, 1930  3 Sheets-Sheet 1

Inventor
James K. Putnam,

By George A. Prevost
Attorney

Sept. 27, 1932.   J. K. PUTNAM   1,879,481
VALVE
Filed Dec. 13, 1930   3 Sheets-Sheet 2

Inventor
James K. Putnam,

By George A. Prevost
Attorney

Sept. 27, 1932.  J. K. PUTNAM  1,879,481
VALVE
Filed Dec. 13, 1930    3 Sheets-Sheet 3

Inventor
James K. Putnam,
By George A. Prevost
Attorney

Patented Sept. 27, 1932

1,879,481

UNITED STATES PATENT OFFICE

JAMES K. PUTNAM, OF TULSA, OKLAHOMA, ASSIGNOR TO HANLON-WATERS, INC., OF TULSA, OKLAHOMA

VALVE

Application filed December 13, 1930. Serial No. 502,195.

My invention consists in new and useful improvements in valves and has for its object to provide a valve which is automatically sealed against leakage past the plug entirely by the pressure of the fluid passing through the line in which the valve is installed, or by the vacuum in said line. I accomplish this by providing a seat in the form of an improved floating sleeve and packing ring arrangement, so constructed and located that the action of the pressure or vacuum on the inlet side of the valve will constantly force the corresponding sleeve into close engagement with the periphery of the plug without the use of springs or other auxiliary means as heretofore employed.

Another object and advantage of my improved structure is, that with the floating seat it is impossible for the plug to stick or freeze, and furthermore, the constant pressure of the seat and of the sleeve against the periphery of the valve plug and its accompanying friction, renders it a self-grinding valve which compensates for any wear on the engaging parts.

A further object of my invention is to provide a valve, the parts of which are easily removable and replaceable, thus prolonging the life of the main structure of the valve through ability to replace the worn parts without discarding the entire structure as is often the case with valves heretofore known.

A still further object of the invention is to provide an improved packing arrangement whereby the valve is securely sealed against leakage.

With the above and other objects in view which will appear as the description proceeds, my invention consists in the novel features herein set forth, illustrated in the accompanying drawings, and more particularly pointed out in the appended claims.

Referring to the drawings in which numerals of like characters designate similar parts throughout the several views, Fig. 1 is a view in side elevation showing the preferred form of my invention.

Figure 1:
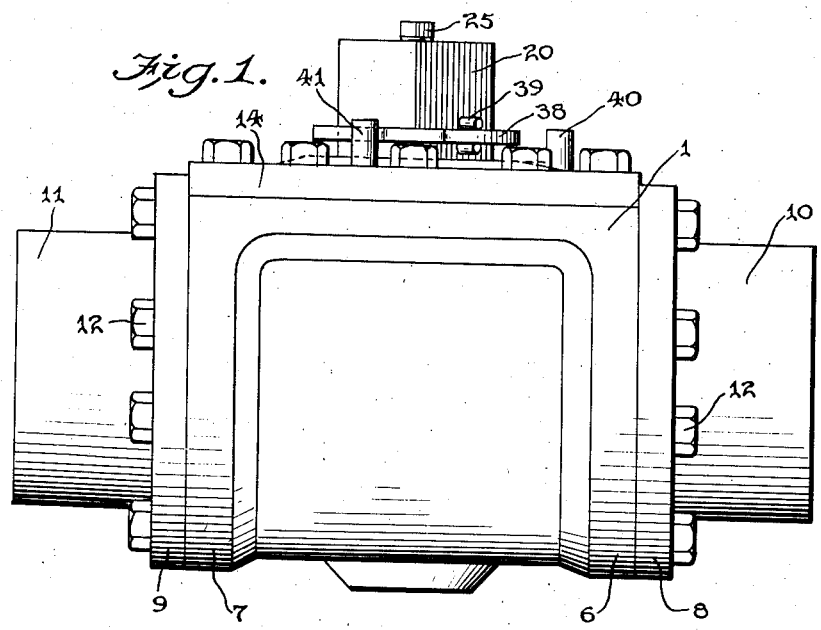
Figure 2:
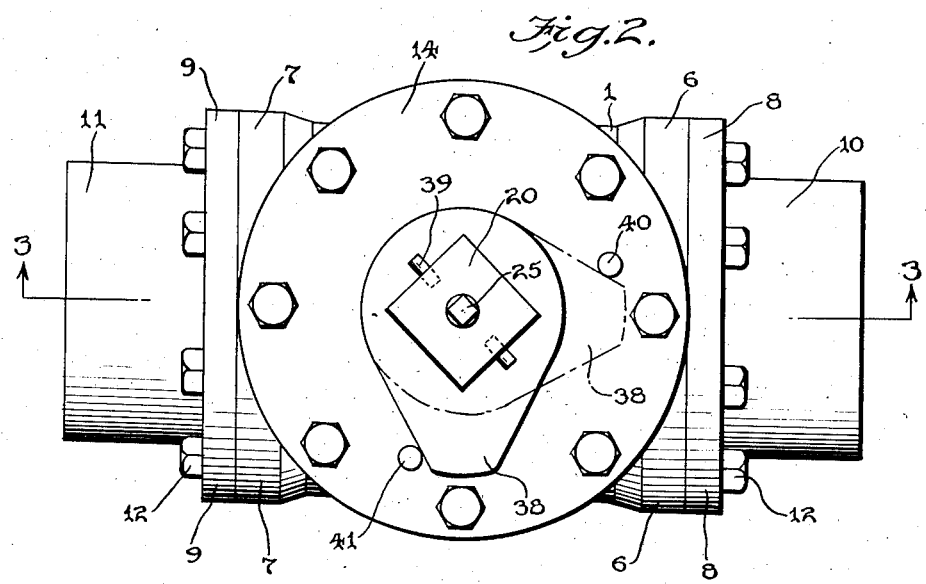
Fig. 2 is a top plan view of the same.

In the drawings, referring now to the form of my invention illustrated in Figs. 1 to 5, 1 designates the main body or casing of the valve which is cast in the desired shape, of any suitable metal, its bottom 2 being completely closed. The body 1 is recessed centrally from its upper end to form an annular barrel 3 for the valve plug 16 hereinafter described, the longitudinal extremities of said body being provided with annular sleeve engaging ports 4 and 5, which extend at right angles to the barrel 3 and are in communication therewith, said extremities terminating in transverse flanges 6 and 7 adapted to abut the flanges 8 and 9 respectively of the pipe unions 10 and 11, said unions being secured in place by suitable bolts 12.

The upper side of the valve body 1 is also flanged as at 13 to engage the flanged cover 14 which is held in place by bolts 15.

The valve plug 16 comprises a cylindrical body transversely and centrally apertured to form a port 17 which extends entirely through said plug. The plug terminates at its lower extremity in a reduced cylindrical gudgeon 18 adapted to register with and engage a complementary recess 19 centrally disposed in the bottom 2, whereby the plug 16 is retained in alignment and prevented from binding when pressure is applied to the valve. The upper extremity of the plug 16 is reduced and squared as at 20 where it projects through an annular opening 21 in the cover 14, said projection forming a stem or tool engaging member for rotating the plug 16 in the barrel 3.

The periphery of the plug 16 is provided towards its upper extremity with an annular lubricating groove 22 which communicates with a plurality of longitudinally disposed flutes 23 in the periphery of said plug, said annular groove 22 being fed from a centrally located reservoir or port 24 in the squared stem 20. This port 24 may be closed by a suitable plug or screw 25.

The upper face of the valve plug proper is provided with a ground joint 26 where it engages the under-surface of the cover 14, whereby a close fit at this point is insured, said upper face being recessed adjacent the ground joint 26 to receive a packing ring 27 which is interposed between the upper face of the plug 16 and the cover 14 in an annular recess 28 provided in the latter.

29 represents a second annular sealing ring which lies in a complementary recess in the upper portion of the valve body 1 at the mouth of the barrel 3, said ring being tightly compressed between the flanged portion of the cover 14 and the mouth of said barrel.

Figure 5:
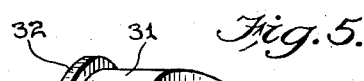
Fig. 5 is a detail perspective view of one of the floating seats.

30 and 31 designate my improved floating seats, the structure of which will be more readily understood by reference to Fig. 5 of the drawings. These seats are preferably cylindrical in shape and provided with annular flanges 32 at their outer extremities, adapted to lie in suitable recesses 33 at the outer termini of the sleeve ports 4 and 5, said recesses being of greater depth than the thickness of the flanges, whereby when the sleeves or seats are inserted within the ports 4 and 5, a predetermined longitudinal movement of the former is permitted. The inner extremities of the sleeves 30 and 31 are transversely grooved as at 34 to accommodate the periphery of the plug 16, the engaging faces of said sleeves being machined to a perfect fit with said plug and forming the seats proper.

Adjacent the flange recesses 33 in the walls of the ports 4 and 5 I provide recesses 35 of larger radius and adapted to receive packing rings 36 which are interposed between the outer faces of the sleeve flanges 32 and the inner faces of the flanges 8 and 9 on the unions 10 and 11, said packing rings 36 extending from the outer edges of their recesses to the inner faces of the sleeves 30 and 31. The unions 10 and 11 are internally threaded to receive the ends of pipe sections and are preferably provided adjacent the inner extremities of said threads with stop rings 37 for preventing said pipe sections from being screwed into the union beyond a predetermined distance, so as to interfere with the free movement and function of the floating sleeves 30 and 31.

38 represents an indicator secured to the squared projection 20 of the plug 16 for indicating the position of the plug. This indicator may be in any suitable form but as illustrated in the drawings, consists of a flat disc-like member cut out centrally to register with the stem 20 and secured in place by suitable pins 39 adapted to be inserted in said stem and engaging the upper and lower surfaces of said disc. Stops 40 and 41, designating the open and closed positions respectively, are secured by any suitable means to the upper surface of the cover 14, and serve to limit the movement of the valve plug through the medium of the projection of the disc 38.

In operation, we will assume that the valve is installed in a pipe line with the port 5 at the inlet end, and the plug 16 in closed position as illustrated in the drawings. When pressure is applied to the line either in the form of liquid or gas, the sleeve 31 is forced inwardly into close engagement with the periphery of the plug 16, due to the action of the fluid pressure upon the surface of the packing ring 36 and the flange 32 of the sleeve. Any leakage past the seating surface 34 into the body of the valve is prevented from escaping from the latter past the flanges 6 and 8, and 7 and 9 respectively, by the packing ring 29, and past the cover 14 and the ground joint 26, by the packing ring 27, these being the only points where leakage would be possible, due to the integral structure of the bottom of the valve body in this embodiment of my invention.

By applying a wrench or other suitable instrument to the squared stem 20 of the plug, the latter may be rotated in the barrel 3 a quarter of a revolution or any fraction thereof, either to completely open the valve by bringing the port 17 in full alignment with the openings in the sleeves 30 and 31, or to secure any degree of throttling action by regulating the rotation of the plug with respect to the openings in the sleeves.

It will be noted that the port 17 may be of any desired shape, either annular, square, oval or rectangular in cross section, but I prefer to employ an annular port as illustrated in the drawings, for the reason that it affords a full volume flow through the line as well as a minute throttling action as will be readily apparent.

As before stated, the periphery of the plug 16 may be lubricated through the groove 22 and flutes 23, thus reducing the friction at the points of contact both with the walls of the barrel and the inner extremities of the floating seats 30 and 31. The constant pressure of the inlet seat 31 against the periphery of the plug 16 provides a self-grinding seat and thus compensates for any wear which takes place between said member and the plug. Furthermore, it will be readily seen that with a structure of this type it will be practically impossible for the plug 16 to stick, due to the cushioning effect which the line pressure has upon the floating sleeve 31.

After the valve has been in use for such a length of time as to cause considerable wear on the seating surface of the sleeve 31 and thus render it ineffective, the sleeves 30 and 31 may be reversed, as originally they are identical in structure. In other words, the sleeve 30, which has been located in the outlet port 4 and thus received very little wear can be removed and inserted in place of the sleeve 31, the latter being transferred to the outlet port.

It will thus be seen that with this type of valve a maximum period of service may be obtained, in that the only parts subjected to wear of any consequence are the floating sleeves, which as before stated, are easily interchangeable or replaceable, thus avoiding the necessity of discarding the complete valve structure.

It will be noted that my improved valve functions equally as effective in a vacuum line as in a pressure line, under the same principles of operation.

Figure 6:
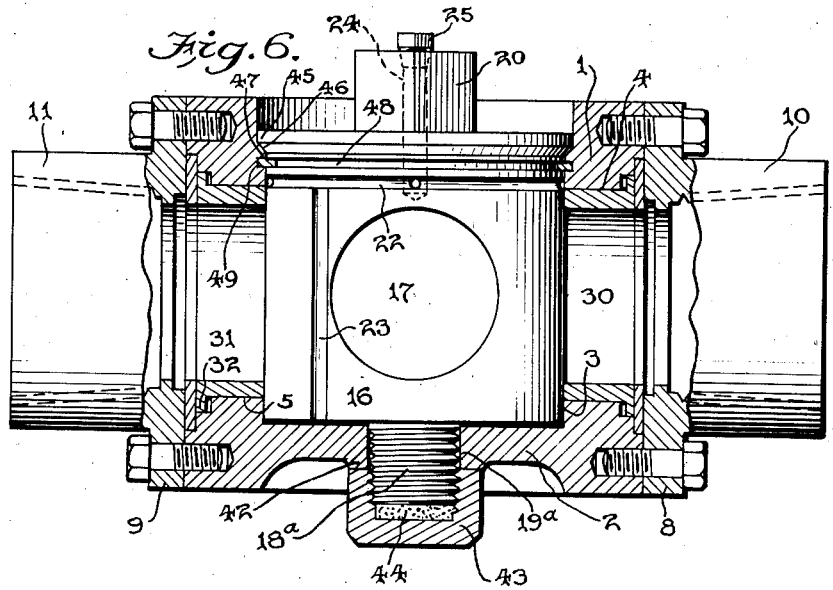
Fig. 6 shows a modified form of my invention embodying the same general principle of operation.

In Fig. 6 I have shown a modified form of my invention which embodies the same general structure and principles of operation as that heretofore described. However, in this modification the cover 14 is eliminated and the valve plug is retained in place by means of a threaded gudgeon 18a which is integral with the plug 16 and projects through an opening 19a in the bottom 2 of the valve body. The under-surface of the body immediately adjacent the opening 19a is raised to form an annular shoulder 42 adapted to abut the adjacent edge of a lock cap 43, the engaging surfaces of said shoulder and collar being in the form of a ground joint to prevent leakage past the same from the interior of the valve body. In addition to the ground joint I may provide a suitable packing 44 in the bottom of the lock cap 43, which when compressed by the pressure of the gudgeon 18a within the cap 43, will facilitate the sealing of the lower portion of the valve against leakage.

The upper end of the plug 16 is slightly flared to form a shoulder 45 which engages a corresponding shoulder in the upper portion of the valve body, the points of contact between said shoulders being in the form of a ground joint 46 which holds said plug slightly suspended within the barrel 3, thus allowing for a downward pressure when the lock cap 43 is screwed tightly in place on the gudgeon 18a.

The upper end of the valve body is sealed against leakage past the ground joint 46 by means of a split ring 47 which fits between the engaging surfaces of the plug 16 and the barrel 3, in suitable grooves 48 and 49, provided in the periphery of the plug 16 and the wall of the barrel 3, respectively, as clearly shown in the drawings.

Figure 3:
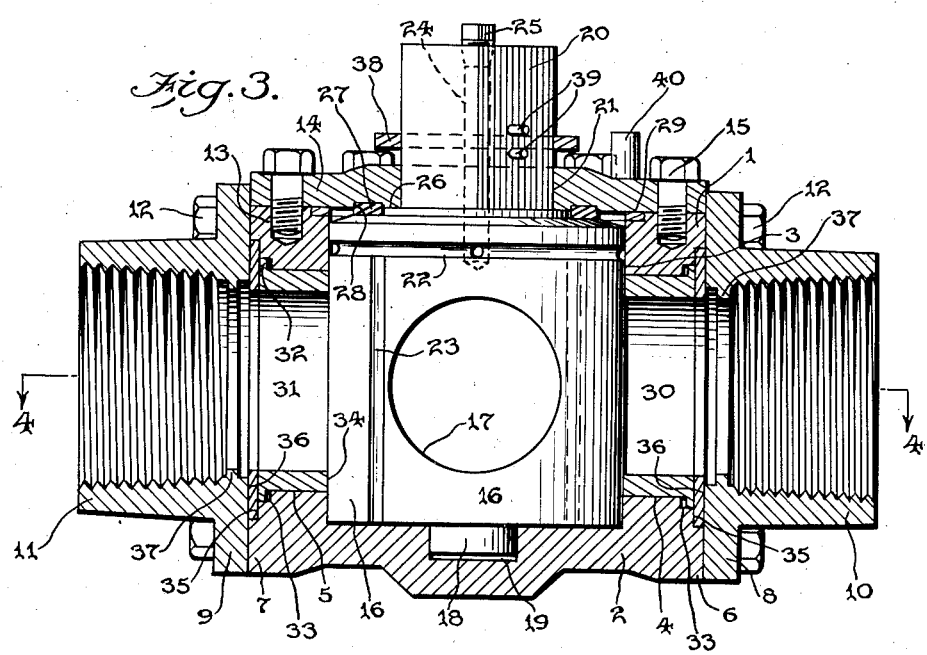
Fig. 3 is a longitudinal sectional view taken on line 3—3 of Fig. 2.
Figure 4:
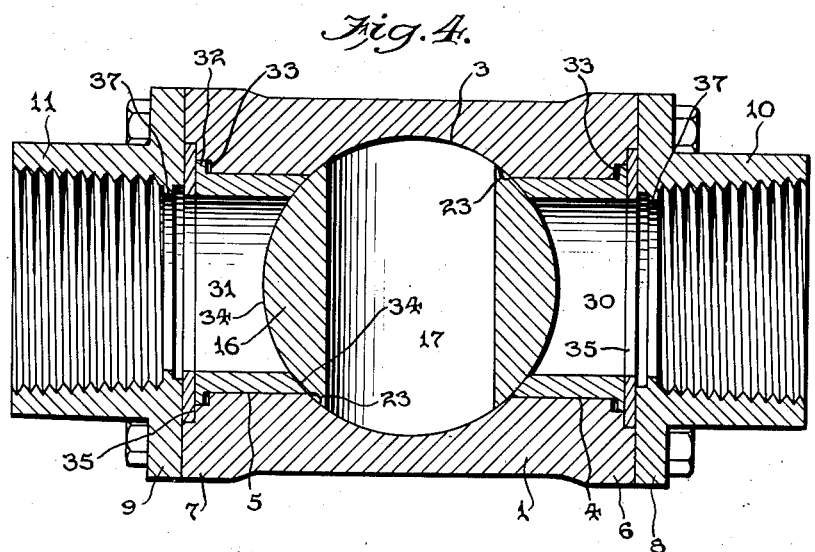
Fig. 4 is a sectional view taken on line 4—4 of Fig. 3.
Figure 7:
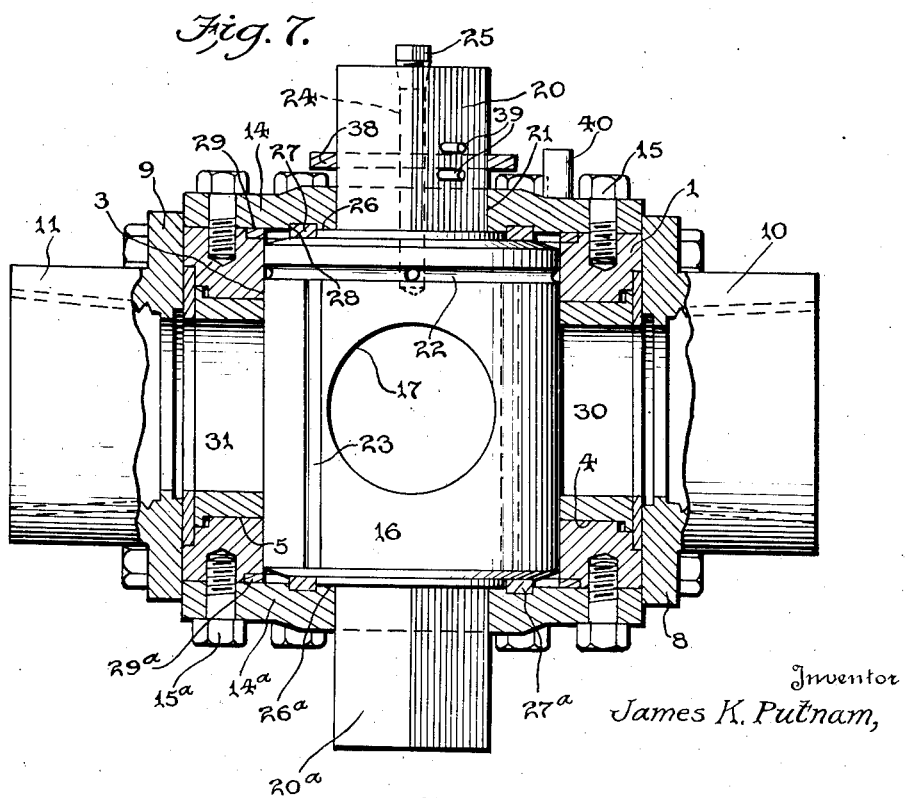
Fig. 7 shows a still further modification.

The embodiment of my invention illustrated in Fig. 7 contemplates a valve constructed practically identically with the valve illustrated in Fig. 3, with the exception that instead of the integral closed bottom 2, heretofore described, in this modified form, the bottom is constructed substantially as a duplicate of the top structure, having a flanged cover 14a apertured to receive an additional squared stem 20a and provided with packing rings 27a and 29a and a ground joint at 26a, all of which elements function in the same manner as those heretofore described in connection with the upper assembly of the valve shown in Fig. 3.

A structure of this type renders the valve accessible and operable from either side and as the squared stem 20a extends through the bottom cover 14a, the pressure within the valve body and around the plug will be equalized, thus increasing the efficiency of the valve and making it possible to more readily open and close the same.

It is believed unnecessary to further explain the operation of the modifications shown in Figs. 6 and 7, inasmuch as they are identical with that heretofore described so far as function and principle are concerned.

From the foregoing it is believed that the construction and operation of my improved structure may be clearly understood by those skilled in the art without further description, it being borne in mind that numerous changes may be made in the details of construction without departing from the spirit of the invention as set forth in the following claims.

What I claim and desire to secure by Letters Patent is:—

1. In a valve of the character described, a casing having inlet and outlet ports, a ported plug rotatably mounted in said casing, said inlet port slidably supporting a substantially elongated floating sleeve which lies entirely within the port, the inner end of said sleeve being adapted to seat against the periphery of said plug, the outer end of said sleeve terminating in a flange, whereby, when pressure is applied to said inlet port, said sleeve is forced into engagement with said plug.

2. In a valve of the character described, a casing having inlet and outlet ports, a ported plug rotatably mounted in said casing, said inlet port slidably supporting a substantially elongated floating sleeve which lies entirely within the port, the inner end of said sleeve being adapted to seat against the periphery of said plug, the outer end of said sleeve terminating in a flange for increasing the fluid contact surface thereof, and a packing ring located anterior to said flange, whereby, when pressure is applied to said inlet port, said sleeve is forced into engagement with said plug.

3. A valve as claimed in claim 2 wherein said packing ring is of greater width than said flange.

4. In a valve of the character described, a casing having inlet and outlet ports, a ported plug rotatably mounted in said casing, said inlet port slidably supporting a substantially elongated floating sleeve which lies entirely within the port, the inner end of said sleeve being adapted to seat against the periphery of said plug, a packing ring of greater width than the thickness of said sleeve, mounted adjacent the outer end of the latter, whereby, when pressure is applied to said inlet port, said sleeve is forced into engagement with said plug.

5. A valve as claimed in claim 2 wherein the outlet port is also provided with a flanged floating sleeve and packing ring, whereby the valve is reversely operable.

6. A valve of the character described, including a casing having an integral closed bottom, inlet and outlet ports in said casing, a ported plug rotatably mounted in said casing transversely to said ports, means for pivotally securing said plug in alignment, a cover for said casing, apertured centrally to receive an upwardly projecting valve stem, means for sealing the upper end of said casing against leakage, said inlet port slidably supporting a substantially elongated floating sleeve which lies entirely within said port, the inner end of said sleeve being shaped to conform with and adapted to seat against the periphery of said plug, and means co-operating with the outer end of said sleeve, whereby, when pressure is applied to said inlet port, said sleeve is forced into engagement with said plug.

7. A valve as claimed in claim 6 wherein the outer end of said sleeve terminates in a flange, and wherein said last-named means includes a sealing ring of greater width than said flange arranged anterior thereto.

8. A valve as claimed in claim 6 wherein said cover abuts a portion of the upper face of said plug, a sealing ring interposed between said cover and the upper face of said plug adjacent said point of abutment, and a second sealing ring interposed between said cover and the upper extremity of the wall of said casing, whereby said casing is sealed against leakage past the cover and valve stem, and past the cover and casing, respectively.

9. A valve of the character described, including a casing having inlet and outlet ports, a ported plug rotatably mounted in said casing, its lower end extending through the bottom of said casing in the form of a threaded gudgeon, the upper end of said plug being provided with a shoulder engaging a complementary shoulder in the wall of said casing, a ground joint at said point of engagement, a lock cap adapted to be screwed onto said threaded gudgeon for drawing said plug tightly into said casing, a second ground joint between the abutting surfaces of said lock cap and said casing, means for sealing said casing against leakage, said inlet port being provided with a floating sleeve, the inner end of which is shaped to conform with and adapted to seat against the periphery of said plug, the outer end of said sleeve terminating in a flange for increasing the fluid contact surface thereof, and a packing ring arranged anterior to said flange and of greater width than the latter, whereby, when pressure is applied to said inlet port, said sleeve will be forced into engagement with said plug.

10. A valve as claimed in claim 9 wherein the upper end of said plug is provided with a peripheral groove, adapted to register with a corresponding groove in the wall of said casing, and a split sealing ring adapted to be inserted in said groove between said plug and the wall of said casing.

11. A valve of the character described including a casing having inlet and outlet ports and openings in its top and bottom walls, a ported plug rotatably mounted in said casing transversely to said ports and having valve stems projecting through said top and bottom openings, top and bottom covers adapted to close said openings and apertured to receive said stems, means for sealing said casing against leakage, said inlet port being provided with a floating sleeve, the inner end of which is shaped to conform with and adapted to seat against the periphery of said plug, the outer end of said sleeve terminating in a flange for increasing the fluid contact surface, and a packing ring of greater width than said flange, whereby, when pressure is applied to said inlet port, said sleeve is forced into engagement with said plug.

12. A valve as claimed in claim 11 wherein said top and bottom covers are arranged in contact with portions of the upper and lower faces of said plug, ground joints at said points of contact, sealing rings interposed between said covers and the adjacent surfaces of said plug, and other sealing rings interposed between the adjacent surfaces of said covers and the extremities of said casing.

13. In a valve of the character described, a casing having inlet and outlet ports, a ported plug rotatably mounted in said casing, said inlet port slidably embracing a floating sleeve, the inner end of which is adapted to seat against the periphery of said plug, means located adjacent the outer end of said sleeve, rigidly secured at a portion of its area but flexible beyond said portion, said flexible portion being adapted to be acted upon by a pressure of the fluid entering said valve, to force said sleeve into engagement with the valve.

14. In a valve of the character described, a casing having inlet and outlet ports, a ported plug rotatably mounted in said casing, said inlet port slidably embracing a floating sleeve, the inner end of which is adapted to seat against the periphery of said plug, an annular ring located adjacent the outer end of said sleeve, rigidly secured at a portion of its area but flexible beyond said portion, said flexible portion being adapted to be acted upon by a pressure of the fluid entering said valve, to force said sleeve into engagement with the valve plug.

15. In a valve of the character described, a casing having inlet and outlet ports, a ported plug rotatably mounted in said casing, said inlet port slidably embracing a floating sleeve, the inner end of which is adapted to seat against the periphery of said plug, the outer end of said sleeve terminating in a surface of increased area, pipe unions adapted to be secured to said casing adjacent said inlet and outlet ports, and a sealing ring of greater width than the thickness of the end of said sleeve, interposed between the inner face of the inlet pipe union and the adjacent end of said sleeve, said ring being adapted to be acted upon by the pressure of the fluid entering said valve to force said sleeve into engagement with the valve plug.

In testimony whereof I affix my signature.

JAMES K. PUTNAM.